July 21, 1964 H. L. PERAZONE 3,141,647
VALVE WITH REMOTE CONTROL ACTUATOR
Filed Aug. 18, 1960 2 Sheets-Sheet 2
FIG_3
FIG_4
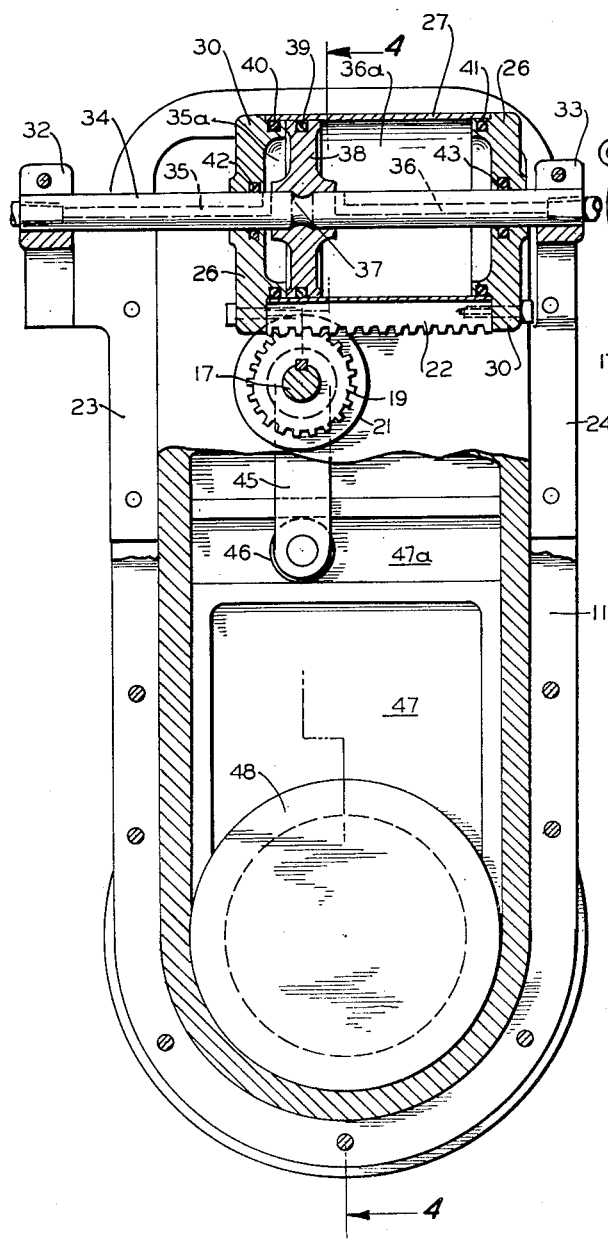
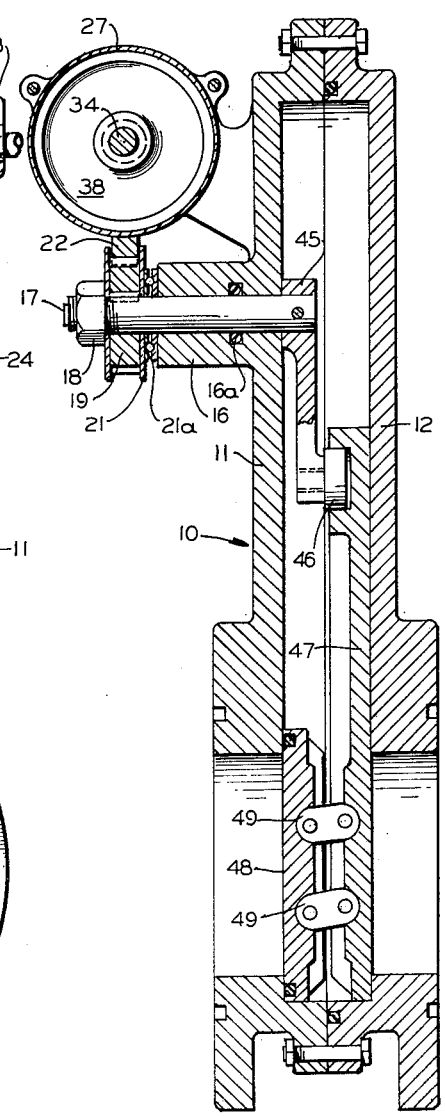
INVENTOR.
HUGH L. PERAZONE
BY
*Allen and Corony*
ATTORNEYS

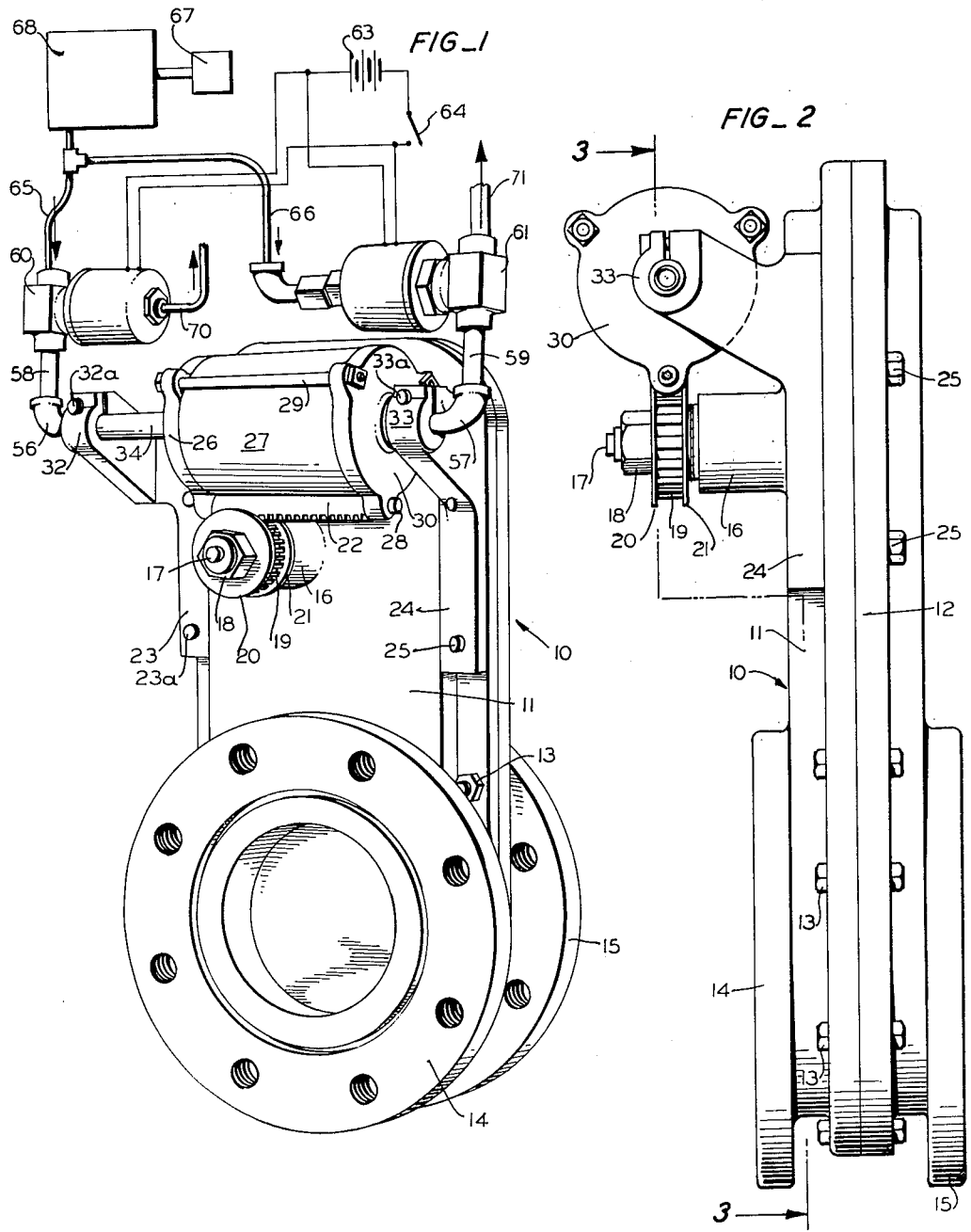

United States Patent Office 3,141,647
Patented July 21, 1964

3,141,647
VALVE WITH REMOTE CONTROL ACTUATOR
Hugh L. Perazone, 2775 Lancaster Road, Hayward, Calif.
Filed Aug. 18, 1960, Ser. No. 50,499
5 Claims. (Cl. 251—31)

This invention relates to a remote control actuator mechanism for use on gate valves and the like.

An object of this invention is to provide an improved remote control actuator for operating a valve from a remote point.

Another object of this invention is to provide an improved remote control valve actuating mechanism that is adapted to be employed for controlling the passage of fluids carrying material that may be emitting various radiations generated by radioactive elements carried or contained in such fluids.

A further object of this invention is to provide an improved control mechanism for actuating a valve, said mechanism being attached to the valve housing and employing a stationary piston and a movable cylinder for actuating a rack and a pinion that is connected to operate the valve member while at the same time permitting access to the valve for manual operation thereof.

Still another object of this invention is to provide an improved remote control actuator mechanism for operating a valve from a remote point, said mechanism being provided with a movable piston that is connected to a rack and pinion arrangement for actuating the valve member, said mechanism also being provided with electrically controlled means for controlling the fluid pressure to the cylinder in such a way that in case of power failure the mechanism functions to close the valve.

Other and further objects of this invention will be apparent to those skilled in the art to which it relates from the following specification, claims and drawings.

In accordance with this invention, there is provided an improved remote control actuator that is adapted to be employed for controlling a valve from a remote point whereby the passage of fluids containing or carrying radioactive materials may be controlled from such remote point and it is not necessary for the operator to be exposed to the radiation given off by such radioactive materials when it is desired to open or close the valve. This invention is adapted to be employed with the slidable gate valve of the type disclosed in Patent No. 2,850,260 issued on September 2, 1958.

The valve mechanism disclosed in this patent includes a slidable member that is positioned in a housing and is adapted to be engaged by a rotatable crank which functions to open or close the valve upon rotation of the crank through an angle of approximately 180 degrees. In accordance with this invention a remotely controlled actuator is efficiently and relatively inexpensively mounted directly on the housing of this valve structure. This valve actuator includes a cylinder provided with connections for supplying it with compressed air or other actuating fluid which is supplied thereto through suitable tubing that is connected to the source of compressed air supply through suitable solenoid controlled valves. These and other features of this invention will be set forth in detail in the following specification and drawing in which briefly:

FIG. 1 is a perspective view of an embodiment of this invention;

FIG. 2 is a side elevation of the valve and control mechanism;

FIG. 3 is a sectional view taken on line 3—3 of FIG. 2; and

FIG. 4 is a sectional view taken along the line 4—4 of FIG. 3.

Referring to the drawing in detail, there is illustrated a gate valve 10 of the type disclosed in Patent No. 2,850,260 which is provided with means in accordance with this invention for remote control thereof. This valve comprises two housing sections 11 and 12 which are held together by bolts 13 and 25 and which have flanges 14 and 15 for the purpose of attaching the valve to a conduit or plumbing line. The member 11 is provided with a projection or boss 16 with a hole therethrough for receiving the shaft 17 that projects out of the valve housing and has fixedly attached thereto a pinion gear 19 which is positioned between the washers 20 and 21 and is held on the shaft by means of a nut 18 that engages the threaded end of this shaft. The washers 20 and 21 are larger than the gear 19 and extend over the sides of the rack 22 so that they guide this rack in its movement therebetween.

The gear rack 22, the ends of which are attached by bolts 28 to the end plates 26 and 30 of the cylinder mechanism, is provided to mesh with the pinion gear 19. The cylinder mechanism is provided with a cylinder wall 27 which is clamped between the end plates 26 and 30 and held in this clamping relation by three equally spaced means including a pair of bolts such as the bolt 29 and the rack 22. The rack 22 is attached to the end plates by means of bolts 28 and functions as the third member for holding the cylinder wall 27 and the end plates 26 and 30 in assembled relation.

The cylinder mechanism is supported on a slide rod 34 which is provided with suitable passages 35 and 36 which extend to the opposite ends of this rod and communicate with the cavities 35a and 36a, respectively, on the opposite sides of the piston member 38. This piston is preferably made by die casting and is cast so that portions thereof project into the groove 37 formed in the central part of the rod 34 so that it is fixedly attached to the rod. A peripheral groove is formed in the piston 38 to receive the O-ring gasket 39 which forms a sliding seal between this piston and the inner wall of the cylinder 27. Similar grooves are provided in the end plates 30 and 26 for receiving the O-rings 40 and 41 respectively which also form seals between these end plates and the cylinder. O-rings 42 and 43 are positioned in suitable grooves formed in the end plates 26 and 30 respectively for sealing engagement with the rod 34.

The crank or lever 45 has one end thereof attached to the inner end of the shaft 17 as shown in FIG. 4 and the other end of this crank is provided with a roller 46 which engages the plate 47 in the transverse groove 47a thereof as shown in FIG. 3. The plate 47 is movable in the cavity inside of the housing members 11 and 12 and across the passage formed through the valve which passage is adapted to be controlled by this valve mechanism. The valve mechanism is shown in its closed position in FIGS. 3 and 4 and in this position the links 49 which are positioned between the slide member 47 and the valve member 48 press the valve member 48 against its seat formed around the passage in the housing member 11. This valve mechanism is described and claimed in Patent No. 2,850,260.

The bracket members 23 and 24 are attached to the sides of the housing member 11 by means of the bolts 23a and 25 respectively and these bolts extend through the housing members 11 and 12 so that they also function to clamp these members together. The end portions of the brackets 32 and 33 are provided with holes for receiving the end portions of the rod 34. These end portions of the brackets are made in the shape of clamps and may be tightened around the rod 34 by tightening up on the bolts 32a and 33a. Elbow pipe couplings 56 and 57 are attached to the ends of the rod 34 and provide connections to the pipes 58 and 59 respectively to which the solenoid valves 60 and 61 respectively are attached. The solenoid valves 60 and 61 are of conventional design. Valve 60 is a normally closed valve and valve 61 is of the normally open type. Each of these valves is provided with a solenoid winding that is adapted to be energized from a source of current supply 63 which may be a battery or other conventional current supply such as the 110 volt lighting circuit. The solenoids of valves 60 and 61 are adapted to be connected to this source by the switch 64 and when this switch is closed the normally closed valve 60 is opened and the normally open valve 61 is closed. The valve 60 is connected to the compressed air reservoir 68 by means of the pipe 65 and the valve 61 is connected thereto by means of a pipe 66. A suitable motor driven compressor 67 of conventional design is provided to supply compressed air to the reservoir 68 for maintaining the compressed air supply.

The three-way valves 60 and 61 are provided with outlets 70 and 71 respectively which open to the atmosphere. Thus in the case of valve 61 which is normally open, the passage between the pipes 66 and 59 is normally open when the solenoid of this valve is not energized so that air pressure from the reservoir 68 would be supplied to the cavity 36a of the cylinder mechanism at such time. At such time also the passage between the pipe 59 and outlet to the atmosphere 71 is closed through this valve 61. The valve 60 on the other hand is normally closed when the solenoid thereof is not energized and consequently the passage between the pipes 58 and 65 is normally closed in this valve so that air pressure from the reservoir 68 is not supplied to the cavity 35a under such conditions. Also under these conditions the passage between the pipe 58 and the outlet 70 is open so that the cavity 35a of the cylinder mechanism is open to the outer atmosphere at this time. Thus under these conditions, when the solenoids of the valves 60 and 61 are not energized, the cylinder mechanism is connected to the compressed air reservoir 68 and air pressure is supplied to the cavity 36a so that the mechanism shifts the valves slide 47 into closed position in which the valve plate 48 closes the passage through the valve. When it is desired to open the valve mechanism the switch 64 is closed, thereby energizing the solenoids of the valves 60 and 61 so that the passage between the pipes 59 and 66 is closed in valve 61 and the passage between the pipes 59 and 71 is open in this valve and at the same time the passage between the pipes 58 and 65 is open in the valve 60 so that compressed air from the reservoir 68 is supplied to the cylinder cavity 35a thereby moving the cylinder mechanism to the left and causing the rack 22 to rotate the pinion 19. This operation turns the crank 45 counterclockwise and the slide 47 is moved out of the passage so that this passage is open. During this operation the air from the cavity 36a of the cylinder is exhausted to the atmosphere through the pipes 59 and 71.

It will be noted that the cylinder mechanism is slidably mounted on the rod 34 and during its sliding movement on this rod the rack 22 slides between the washers 20 and 21 while it engages and rotates the pinion 19. Thus the washers 20 and 21 guide the rack 22 between them and prevent the cylinder mechanism from turning on the rod 34 if the rack 22 is straight and parallel to the rod 34. If the rack 22 is not straight and also parallel to the rod 34 then the washers 20 and 21 will still guide this rack, but the cylinder mechanism will be turned on the rod 34 an amount depending on how much the rack is out of parallel with the rod 34. Thus slight inaccuracies of this kind will not render the unit inoperative.

Also it will be noted that the nut 18 is also accessible so that a wrench or other tool may be applied thereto for manual operation of the valve if desired.

While I have shown a preferred embodiment of the invention it will be understood that the invention is capable of variation and modification from the form shown so that its scope should be limited only by the scope of the claims appended hereto.

I claim:

1. In valve control apparatus wherein the valve is provided with a housing having a fluid passage therethrough and slidable means for controlling said passage, said slidable means being operable by a member extending out of said housing, the improvement comprising a pinion gear, means for attaching said pinion gear to the valve operating member on the outside of the valve housing, a pair of spaced members attached to said housing, a rod fixedly supported by said spaced members, a piston attached to said rod, a cylinder slidably positioned on said rod and on said piston, a rack having teeth meshing with teeth of said pinion gear, means for attaching said rack to said cylinder so that said valve operating member is operated when said cylinder is moved, and means for supplying fluid pressure to said cylinder for sliding it on said rod and on said piston.

2. In valve control apparatus wherein the valve is provided with a housing having a fluid passage therethrough and slidable means for controlling said passage, said slidable means being operable by a member extending out of said housing, the improvement comprising a pinion gear, means for attaching said pinion gear to the valve operating member on the outside of the valve housing, a pair of spaced members attached to said housing, a rod fixedly supported by said spaced members, a piston attached to said rod, a cylinder slidably positioned on said rod and on said piston, a rack having teeth meshing with teeth of said pinion gear, a pair of washers positioned one on each side of said pinion gear for slidably engaging the opposite sides of said rack and prevent said cylinder from turning on said rod as said cylinder is moved on said rod, means for attaching said rack to said cylinder so that said valve operating member is operated when said cylinder is moved, and means for supplying fluid pressure to said cylinder for sliding it on said rod and on said piston.

3. In valve control apparatus wherein the valve is provided with a housing having a fluid passage therethrough and slidable means for controlling said passage, said slidable means being operable by a member extending out of said housing, the improvement comprising a pinion gear, means for attaching said pinion gear to the valve operating member on the outside of the valve housing, a pair of spaced members attached to said housing, a rod fixedly supported by said spaced members, said rod having a groove around the circumference thereof substantially midway between the ends thereof, a piston cast around said rod and into said groove, a cylinder slidably positioned on said rod and on said piston, a rack having teeth meshing with teeth of said pinion gear, means for attaching said rack to said cylinder so that said valve operating member is operated when said cylinder is moved, and means for supplying fluid pressure to said cylinder for sliding it on said rod and on said piston.

4. In valve control apparatus wherein the valve is provided with a housing having a fluid passage therethrough and slidable means for controlling said passage, said slidable means being operable by a member extending out of said housing, the improvement comprising a pinion gear, means for attaching said pinion gear to the valve operating member on the outside of the valve housing a pair of spaced members attached to said housing, a rod fixedly supported by said spaced members, a piston attached to said rod, a cylinder slidably positioned on said rod and on said piston, a rack having teeth meshing with teeth of said pinion gear, means for attaching said rack to said cylinder so that said valve operating member is operated when said cylinder is moved, and a pair of valves for controlling the supplying fluid pressure to said cylinder for sliding it on said rod and on said piston, one of said pair of valves being normally open and the other being normally closed, said normally open one of said valves when in normal position controlling the fluid pressure to said cylinder to actuate said cylinder to close said first mentioned valve.

5. In valve control apparatus wherein the valve is provided with a housing having a fluid passage therethrough and slidable means for controlling said passage, said slidable means being operable by a member extending out of said housing, the improvement comprising a pinion gear, means for attaching said pinion gear to the valve operating member on the outside of the valve housing, a pair of spaced members attached to said housing, a rod fixedly supported by said spaced members, said rod having a groove around the circumference thereof substantially midway between the ends thereof, a piston cast around said rod and into said groove, a cylinder slidably positioned on said rod and on said piston, a rack having teeth meshing with teeth of said pinion gear, a pair of washers positioned one on each side of said pinion gear for slidably engaging the opposite sides of said rack and prevent said cylinder for turning on said rod as said cylinder is moved on said rod, means for attaching said rack to said cylinder so that said valve operating member is operated when said cylinder is moved, and a pair of valves for controlling the supplying fluid pressure to said cylinder for sliding it on said rod and on said piston, one of said pair of valves being normally open and the other being normally closed, said normally open one of said valves when in normal position controlling the fluid pressure to said cylinder to actuate said cylinder to close said first mentioned valve.

References Cited in the file of this patent
UNITED STATES PATENTS

| | | |
|---|---|---|
| 241,636 | Eavenson | May 17, 1881 |
| 674,213 | Oldfield | May 14, 1901 |
| 2,850,260 | Perazone et al. | Sept. 2, 1958 |